US011995810B2

(12) United States Patent
Lau et al.

(10) Patent No.: US 11,995,810 B2
(45) Date of Patent: May 28, 2024

(54) SYSTEM AND METHOD FOR GENERATING A STAINED IMAGE

(71) Applicant: City University of Hong Kong, Kowloon (HK)

(72) Inventors: Condon Lau, Kowloon (HK); Tik Ho Hui, Quarry Bay (HK); Yixuan Yuan, New Territories (HK); Zhen Chen, Kowloon (HK); Chi Shing Cho, Kowloon (HK); Wah Cheuk, Kowloon (HK); Wing Lun Law, Kowloon (HK); Mohamad Ali Marashli, Kowloon (HK); Anupam Pani, Causeway Bay (HK); Fraser Hill, Kowloon (HK)

(73) Assignee: City University of Hong Kong, Kowloon (HK)

( * ) Notice: Subject to any disclaimer, the term of this patent is extended or adjusted under 35 U.S.C. 154(b) by 266 days.

(21) Appl. No.: 17/241,475

(22) Filed: Apr. 27, 2021

(65) Prior Publication Data

US 2022/0343473 A1 Oct. 27, 2022

(51) Int. Cl.
*G06K 9/00* (2022.01)
*G01N 1/30* (2006.01)
(Continued)

(52) U.S. Cl.
CPC ............... *G06T 5/94* (2024.01); *G01N 1/30* (2013.01); *G06T 3/4007* (2013.01); *G06T 5/00* (2013.01);
(Continued)

(58) Field of Classification Search
CPC ......... G06T 5/008; G06T 7/30; G06T 3/4007; G06T 5/001; G06T 5/50; G06T 2207/10064; G06T 2207/20081; G06T 2207/30024; G06T 7/00; G06T 5/00; G06T 2211/00; G06T 7/0012; G06T 11/001; G06T 7/0014; G01N 1/30; G01N 2001/302; G01N 21/6458; A61P 27/06; A61P 3/00;
(Continued)

(56) References Cited

U.S. PATENT DOCUMENTS

2013/0279752 A1* 10/2013 Thomas ............... G06V 20/693
382/103
2014/0086907 A1* 3/2014 Shah ................... A61K 39/3955
435/174

(Continued)

OTHER PUBLICATIONS

K. de Haan, Y. Rivenson, Y. Wu and A. Ozcan, "Deep-Learning-Based Image Reconstruction and Enhancement in Optical Microscopy," in Proceedings of the IEEE, vol. 108, No. 1, pp. 30-50, Jan. 2020, doi: 10.1109/JPROC.2019.2949575. (Year: 2019).*

(Continued)

*Primary Examiner* — Emily C Terrell
*Assistant Examiner* — Kevin M Coomber
(74) *Attorney, Agent, or Firm* — Renner, Kenner, Greive, Bobak, Taylor & Weber

(57) ABSTRACT

A system and method for generating a stained image including the steps of obtaining a first image of a key sample section; and processing the first image with a multi-modal stain learning engine arranged to generate at least one stained image, wherein the at least one stained image represents the key sample section stained with at least one stain.

34 Claims, 6 Drawing Sheets

(51) Int. Cl.
  *G06T 3/4007* (2024.01)
  *G06T 5/00* (2006.01)
  *G06T 5/50* (2006.01)
  *G06T 5/94* (2024.01)
  *G06T 7/30* (2017.01)

(52) U.S. Cl.
  CPC .................. *G06T 5/50* (2013.01); *G06T 7/30* (2017.01); *G01N 2001/302* (2013.01); *G06T 2207/10064* (2013.01); *G06T 2207/20081* (2013.01); *G06T 2207/30024* (2013.01)

(58) Field of Classification Search
  CPC .... A61P 3/06; A61P 3/10; A61P 39/06; A61P 7/02; A61P 9/08; A61P 13/08; A61P 13/10; A61P 13/12; A61P 17/08; A61P 25/14; A61P 31/12; A61P 31/14; A61P 5/18; A61P 1/06; A61P 1/18; A61P 19/08; A61P 25/04; A61P 27/12; A61P 9/10; A61P 1/04; A61P 11/06; A61P 11/14; A61P 13/00; A61P 17/14; A61P 19/02; A61P 19/10; A61P 21/02; A61P 21/04; A61P 21/06; A61P 23/02; A61P 25/18; A61P 25/26; A61P 31/18; A61P 37/04; A61P 41/00; A61P 5/14; A61P 5/16; A61P 5/50; A61P 7/00; A61P 9/14; A61P 35/00; A61P 27/02; A61P 43/00; A61P 25/00; A61P 29/00; A61P 9/00; A61P 11/00; A61P 17/00; A61P 31/00; A61P 21/00; A61P 25/28; A61P 35/02; A61P 1/16; A61P 37/08; A61P 1/00; A61P 17/02; A61P 25/02; A61P 25/16; A61P 31/04; A61P 35/04; A61P 37/02; A61P 37/06; A61P 17/06; A61P 19/00; C12N 5/00; A61K 49/00; A61K 39/00; A61B 10/00; G06V 10/00; G06V 40/00; G06V 20/69; G06V 10/774; G06V 20/698; G06F 18/20; G16H 50/50; G16H 30/40; G06N 3/094; G06N 3/088
  See application file for complete search history.

(56) References Cited

U.S. PATENT DOCUMENTS

| | | | |
|---|---|---|---|
| 2017/0262984 A1* | 9/2017 | Barnes | G06T 7/0012 |
| 2019/0333199 A1* | 10/2019 | Ozcan | G06T 3/4046 |
| 2020/0394825 A1* | 12/2020 | Stumpe | G06V 20/69 |
| 2021/0043331 A1* | 2/2021 | Ozcan | G06V 10/82 |
| 2023/0139682 A1* | 5/2023 | Kale | G06T 5/002 382/159 |

OTHER PUBLICATIONS

1) Zhu et al., "Semantically Multi-modal Image Synthesis," https://arxiv.org/abs/2003.12697; ARVIX 2020.
2) Zhu et al., "Toward Multimodal Image-to-Image Translation," 31st Conference on Neural Information Processing Systems (NIPS 2017). Long Beach, CA, USA; https://papers.nips.cc/paper/6650-toward-multimodal-image-to-image-translation.pdf.
3) Joyce et al., "Robust Multi-Modal MR Image Synthesis," The University of Edinburgh, MICCAI 2017; http://tsaftaris.com/preprints/Joyce_MICCAI_2017_Synth.pdf.

* cited by examiner

SYSTEM AND METHOD FOR GENERATING A STAINED IMAGE

TECHNICAL FIELD

The present invention relates to a system and method for generating a stained image, and particularly, although not exclusively, to a system and method for generating a virtually stained image of a tissue sample section.

BACKGROUND

The practice of histology is an important area of medical sciences that has helped with medical research, diagnosis and treatment. Part of this practice involves the preparation of slides which contain tissue sections. In turn, these slides can be placed under a microscope for further study or analysis.

Staining tissue for contrast when viewed under a microscope is an integral part of pathology. In various situations, a staining agent or stain, may be used to stain the tissue sections, such as by immersing tissue in chemical or antibody solutions prior to microscopy. These staining agents allow certain cells, features or structures to become more visible when the slides are viewed or considered under magnification. However, physical staining methods can be time consuming and costly. Further, they may contribute to workplace and environmental pollution.

SUMMARY OF THE INVENTION

In accordance with a first aspect of the present invention, there is provided a method for generating a stained image comprising the steps of:
  obtaining a set of first images of a key sample section; and
  processing the first image with a multi-modal stain learning engine arranged to generate at least one stained image, wherein the stained image represents the key sample section stained with at least one stain.

In an embodiment of the first aspect, the key sample section is unstained or stained with an input stain.

In an embodiment of the first aspect, the method further includes the step of obtaining an image of each of at least three adjacent sample sections including the key sample section and adjacent sample sections obtained in proximity to the key sample section.

In an embodiment of the first aspect, one of the at least three adjacent sample sections is stained with an output stain; and wherein the remaining adjacent sample sections are all stained with the input stain.

In an embodiment of the first aspect, the stained image represents the key sample section stained with the output stain.

In an embodiment of the first aspect, the remaining adjacent sample sections are stained with multiple types of the input stain in an alternating manner.

In an embodiment of the first aspect, the multi-modal stain learning engine includes a machine learning network arranged to generate the at least one stained image.

In an embodiment of the first aspect, the machine learning network includes a generator network arranged to generate the at least one stained image over a plurality of cycles and a discriminator network arranged to analysis the at least one stained image to provide feedback to the generator network on each of the plurality of cycles.

In an embodiment of the first aspect, the machine learning network is a generative adversarial network.

In an embodiment of the first aspect, the generative adversarial network is trained with images of the at least three adjacent sample sections stained with both the input stains and the output stain.

In an embodiment of the first aspect, the generative adversarial network is further trained with images of the at least three adjacent sample sections imaged with different illumination conditions.

In an embodiment of the first aspect, the illumination conditions include brightfield or autofluorescence.

In an embodiment of the first aspect, each of the input stain and the output stain includes at least one of hematoxylin and eosin (H&E) and a special stain.

In an embodiment of the first aspect, the special stain includes immunostains.

In an embodiment of the first aspect, the at least three adjacent sample sections are frozen.

In an embodiment of the first aspect, the at least three adjacent sample sections are formalin-fixed and embedded in paraffin.

In an embodiment of the first aspect, the method further comprises the step of correcting spatial mismatches among the stained image representing the key sample section stained with the output stain and the stained images of the adjacent sample sections stained with the input stain with an estimation process.

In an embodiment of the first aspect, the step of correcting the spatial mismatches includes aligning all stained images of the adjacent sample sections stained with the input stain to the stained image representing the key sample section stained with the output stain using a two-dimensional image registration.

In an embodiment of the first aspect, the estimation process is an interpolation method.

In an embodiment of the first aspect, the estimation process is an extrapolation method which further includes a step of applying an image extrapolation transformation to generate at least one estimated input image based on the stained images of the adjacent sample sections stained with the input stain.

In accordance with a second aspect of the present invention, there is provided a system for generating a stained image comprising:
  an image gateway arranged to obtain a set of first images of a key sample section; and
  an image generator arranged to process the set of first images with a multi-modal stain learning engine arranged to generate at least one stained image, wherein the at least one stained image represents the key sample section stained with at least one stain.

In an embodiment of the second aspect, the key sample section is unstained or stained with an input stain.

In an embodiment of the second aspect, the image gateway is further arranged to obtain an image of each of at least three adjacent sample sections including the key sample section and adjacent sample sections obtained in proximity to the key sample section.

In an embodiment of the second aspect, one of the at least three adjacent sample sections is stained with an output stain; and wherein the remaining adjacent sample sections are all stained with the input stain.

In an embodiment of the second aspect, the at least one stained image represents the key sample section stained with the output stain.

In an embodiment of the second aspect, the remaining adjacent sample sections are stained with multiple types of the input stain in an alternating manner.

In an embodiment of the second aspect, the multi-modal stain learning engine includes a machine learning network arranged to generate the at least one stained image.

In an embodiment of the second aspect, the machine learning network includes a generator network arranged to generate the at least one stained image over a plurality of cycles and a discriminator network arranged to analysis the at least one stained image to provide feedback to the generator network on each of the plurality of cycles.

In an embodiment of the second aspect, the machine learning network is a generative adversarial network.

In an embodiment of the second aspect, the generative adversarial network is trained with images of the at least three adjacent sample sections stained with both the input stains and the output stain.

In an embodiment of the second aspect, the generative adversarial network is further trained with images of the at least three adjacent sample sections imaged with different illumination conditions.

In an embodiment of the second aspect, the illumination conditions include brightfield or autofluorescence.

In an embodiment of the second aspect, each of the input stain and the output stain includes at least one of hematoxylin and eosin (H&E) and a special stain.

In an embodiment of the second aspect, the special stain includes immunostains.

In an embodiment of the second aspect, the at least three adjacent sample sections are frozen.

In an embodiment of the second aspect, the at least three adjacent sample sections are formalin-fixed or embedded in paraffin.

In an embodiment of the second aspect, the multi-modal stain learning engine is further arranged to correct spatial mismatches among the stained image representing the key sample section stained with the output stain and the stained images of the adjacent sample sections stained with the input stain with an estimation process.

In an embodiment of the second aspect, the multi-modal stain learning engine is arranged to align all stained images of the adjacent sample sections stained with the input stain to the stained image representing the key sample section stained with the output stain using a three degree-of-freedom rigid-body registration.

In an embodiment of the second aspect, the multi-modal stain learning engine is further arranged to apply an image transformation to generate at least one estimated input image based on the stained images of the adjacent sample sections stained with the input stain.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
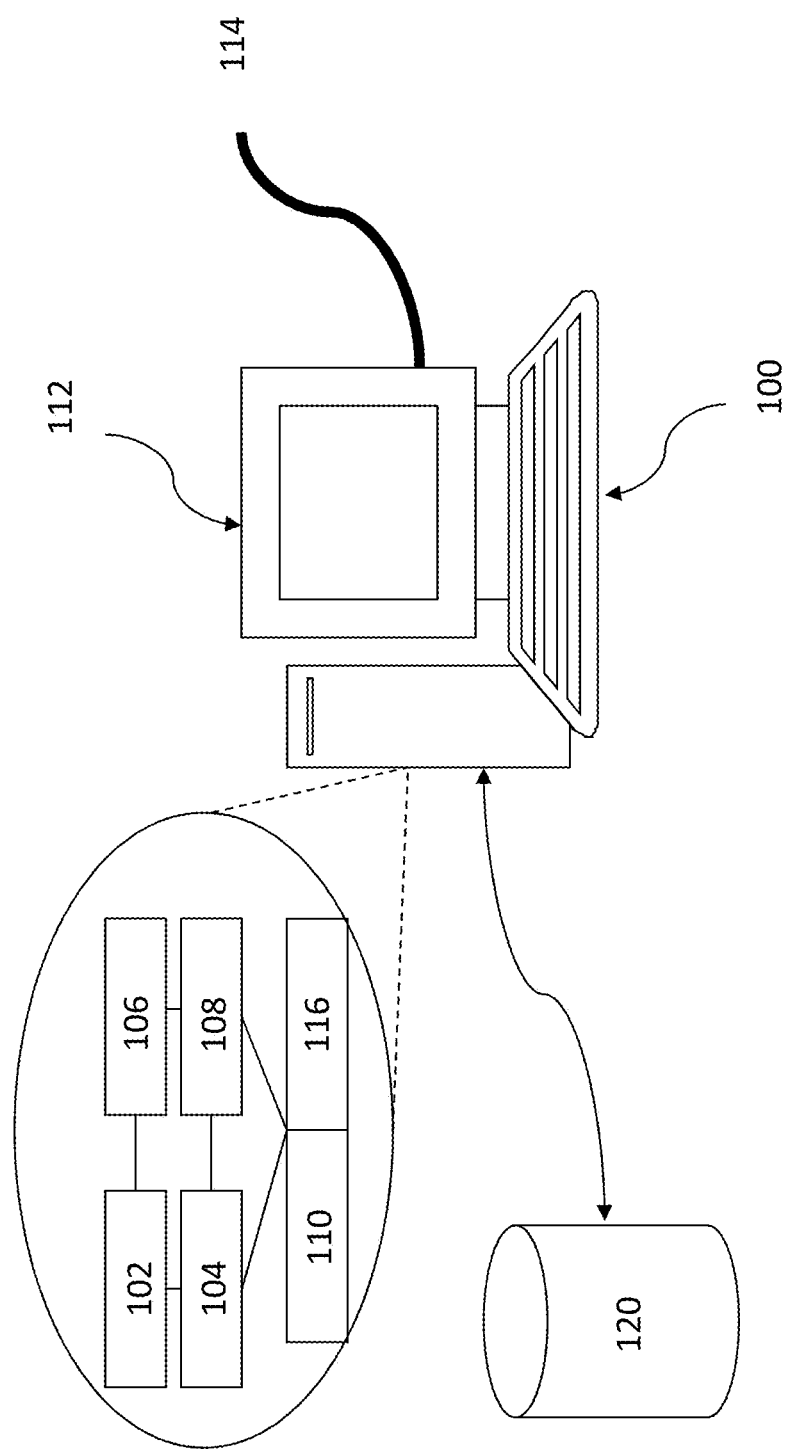
FIG. 1 is a schematic block diagram of a computer system implemented to operate as a system for generating a stained image in accordance with one embodiment of the present invention.

Referring to FIG. 1, an embodiment of the present invention is illustrated. This embodiment is arranged to provide a system for generating a stained image, comprising:

an image gateway arranged to obtain a first image of a key sample section; and an image generator arranged to process the first image with a multi-modal stain learning engine arranged to generate at least one stained image, wherein the at least one stained image represents the key sample section stained with at least one stain.

In this example embodiment, the image gateway and image generator are implemented by a computer having an appropriate user interface, communications port and processor. The computer may be implemented by any computing architecture, including stand alone PC, client/server architecture, "dumb" terminal/mainframe architecture, portable computing devices, tablet computers, wearable devices, smart phones or any other appropriate architecture. The computing device may be appropriately programmed to implement the invention.

Referring to FIG. 1 there is a shown a schematic diagram of a computing system which in this embodiment comprises a server or computing device 100. The server 100 comprises suitable components necessary to receive, store and execute appropriate computer instructions. The components may include a processing unit 102, read only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices such as tablet computers, smartphones or wearable devices. At least one of a plurality of communications link may be connected to an external computing network through a telephone line or other type of communications link.

The server may include storage devices such as a disk drive 108 which may encompass solid state drives, hard disk drives, optical drives or magnetic tape drives. The server 100 may use a single disk drive or multiple disk drives. The server 100 may be able to access one or more remote data storage devices, data bases or cloud-based data centre systems 120 to access information, retrieve data or to obtain or provide commands or instructions. The server 100 may also have a suitable operating system 116 which resides on the disk drive or in the ROM of the server 100.

In this example embodiment, the server or computing device 100 which may be implemented to operate as a system for generating a stained image that may be used to generate a virtual or simulated image of a tissue sample section that has been stained by any one or more of the various staining agents (or known as stains) available to allow medical professionals, scientists or researchers to identify specific features or markers within the tissue sample section.

In some example deployments, the system is arranged to operate with hospital or laboratory equipment to process tissue samples. The system may be connected or arranged to be in communication with an image source, such as a light or electron microscope or tissue image database so as to obtain images of tissue samples. Once an image of a tissue sample is obtained, the system is arranged to process this image so as to generate a new image of the tissue sample, but simulated to have been stained with one or more of various stains as desired by a user. These various stains include standard stains or staining agents such as hematoxylin and eosin (H&E) or non-standard stains or staining agents such as special stains and/or immunostains. Preferably, the system operates to generate a virtual or generated stain image of a tissue sample section which is different to an image of a first stain of the tissue sample. Thus, as an example, if the first image is of an unstained tissue sample, the generated stain image may be of the tissue sample having been stained with a desired staining agent such as H&E. In an alternative example, if the first image is of a tissue sample which has been stained with a first such as H&E, the generated stain image may be of the tissue sample having been stained with a different stain, such as an immunostain.

These generated images, which simulate or model a tissue sample section having been stained with one or more stains or staining agents may in turn be provided to users so as to allow the user to diagnose or provide medical or biological assessments. The generation of these simulated or modelled images may be advantageous as the staining process may alter the physical characteristics of each tissue sample section. This will in turn mean that should a staining agent be used on an example tissue sample section, another staining agent may not be used and thus limiting the presentation of the tissue sample section for research or diagnosing purposes. The ability in generating these simulated or modelled images would therefore allow users to obtain images of tissue sample sections that have been stained with various stains.

By generating simulated and modelled images of stained tissue sample sections, images of tissue sample sections may be simulated to have been stained with various staining agents and thus allowing for greater scope for research or diagnoses purposes. This will in turn improve research and development in the biological and medical science as well as in medical or veterinary treatments. Moreover, examples of the present system for generating a stained image may also be advantageous as the generation of stained images are much faster than the process of physical staining. This offers significant advantages in pathology practices where the analysis of tissue samples is time critical.

Figure 2:
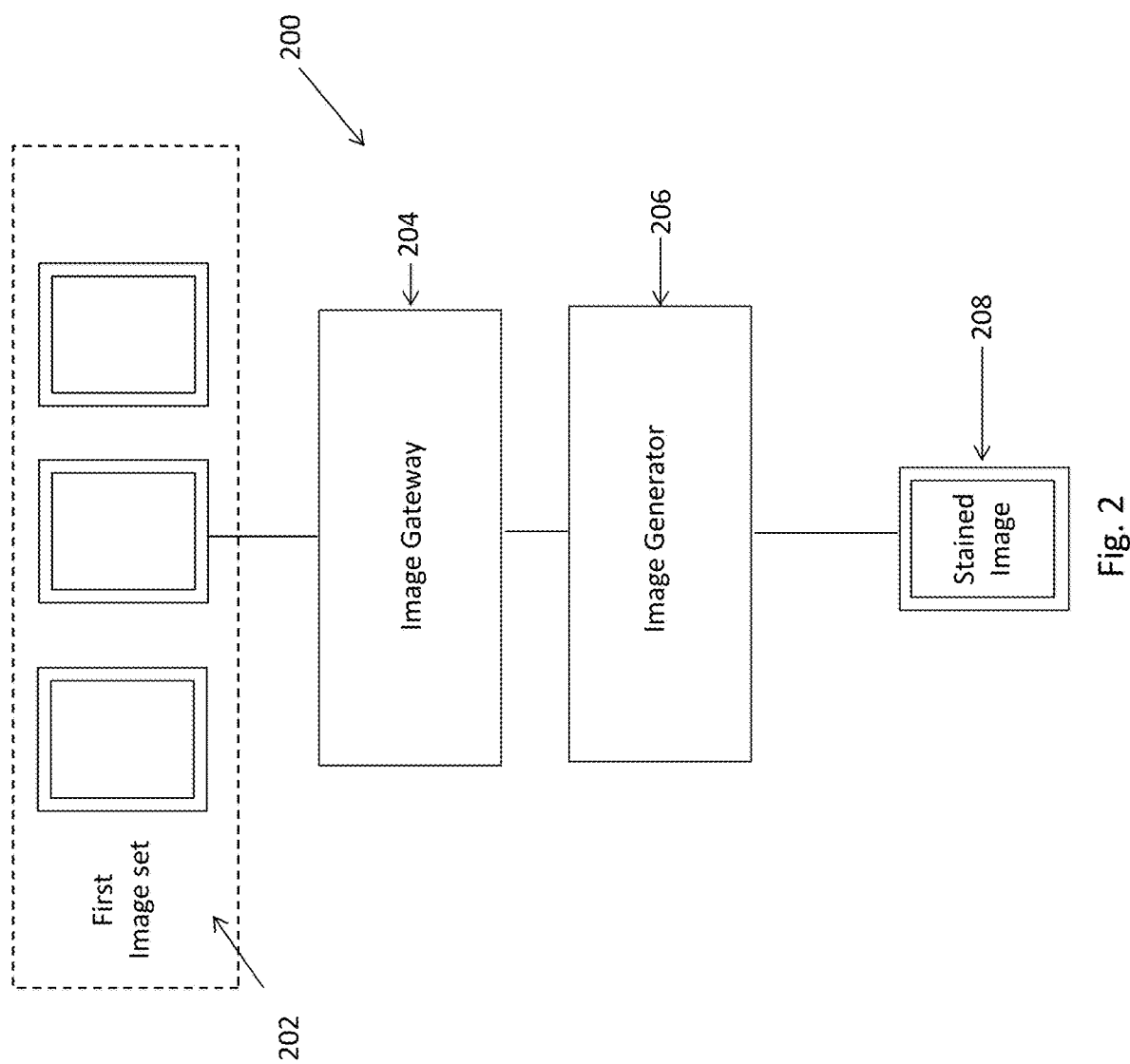
FIG. 2 is a block diagram illustrating the operation process of the system for generating a stained image of FIG. 1.

With reference to FIG. 2, there is illustrated a block diagram illustrating the process flow of am example embodiment of a system for generating a stained image 200. In this example embodiment, the system 200 firstly acquires images of frozen tissue sections 202. These tissue sections, may also be referred to as the key tissue sections or key sample sections and may be unstained, or stained with one or more staining agents, such as hematoxylin and eosin (H&E) or any other stains.

It follows that these images 202 are inputted to the system via an image gateway 204. The image gateway 204, which may be a suitable input device and may be arranged to receive image data from various sources, including from light or electron microscopes, databases, computer networks, computer cloud servers, portable storage devices or other electronic, processing or storage devices. The images 202 that are inputted may be one or more images of tissue sample sections, with or without various stains. Images of adjacent samples with or without various stains may also be optionally inputted also to the image gateway 204. These may be necessary or optional depending on the intention of the user and the level of pre-training undertaken of the image generator 206, which will be described in further detail below with reference to FIGS. 2 and 3.

As shown in this embodiment, the image generator 206 is arranged to receive an image of a tissue sample section 202 and regenerate a new image of the tissue sample section 208 having been stained with one or more staining agents. Preferably, this is performed by a machine learning processor, described further in FIG. 3, within the image generator 206 to simulate the tissue sample section having been stained with a particular staining agent. This machine learning processor may be any type of machine learning architecture capable of learning or retaining knowledge after it has been trained with a sample training set. Preferably, the machine learning processor includes a machine learning network 306, such as a neural network, convolution neural network (CNN), or as described below in one example implementation, a generative adversarial network (GAN).

The machine learning network 306 is arranged to be trained with a plurality of training images of tissue sample sections and stained tissue sample sections. In turn, a trained machine learning network would be able to receive a tissue sample section image as an input and generate a simulated image of the tissue sample section as shown in the tissue sample section image but having been stained with various staining agents. This generated simulated image of the tissue sample section may then be output to the user for further processing, or if necessary, re-training of the machine learning network 306.

Figure 3:
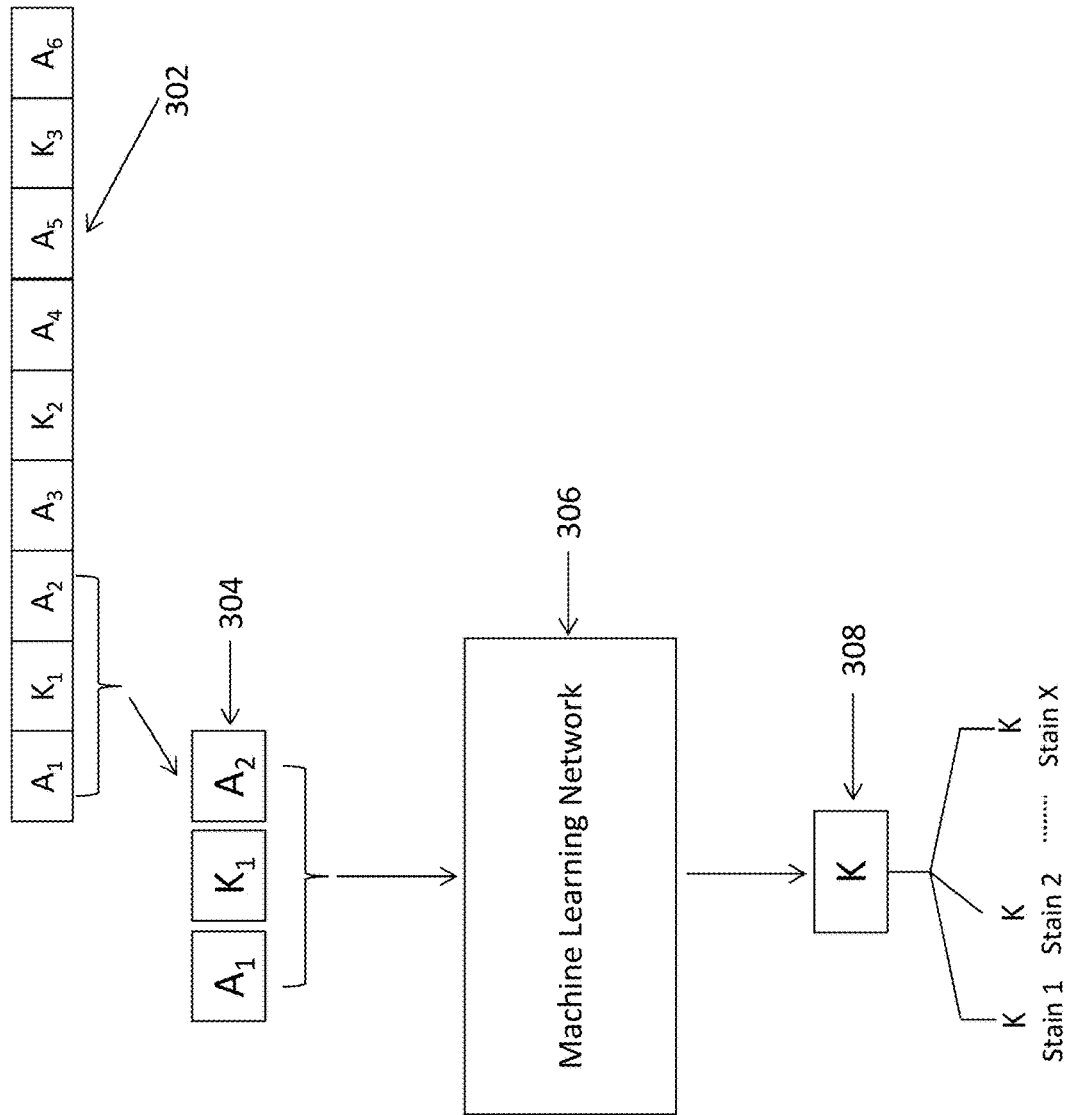
FIG. 3 is a block diagram illustrating the operation of an example machine learning network of the system for generating a stained image of FIG. 2.

With reference to FIG. 3, there is illustrated a block diagram for an example machine learning processor having a machine learning network 306. The block diagram of FIG. 3 is arranged to show an example operation of the machine learning network 306 to generate one or more simulated images 308. The machine learning network may firstly be trained with a suitable training data set, which may, for example, include numerous images of tissue sample sections, adjacent tissue sample sections, stained with various staining agents. Once the network 306 is suitably trained such that it is able to provide an acceptable level of accuracy, images 304 of tissue sample sections 302 may be fed into the network so as to generate an image of the tissue sample sections, simulated to have been stained with one or more staining agents.

For example, tissue samples come from clinical scenarios, such as biopsies and surgical resections. The tissue can be from any organ, and be normal or diseased. Diseases may be different types of cancer, but other diseases requiring histopathological diagnosis may also be suitable. The tissues can be prepared for sectioning using either formalin-fixed/paraffin-embedded or frozen methods.

Separate neural networks may be trained for each disease in virtual staining as different diseases involve different tissue types and are diagnosed with different preparation methods and stains. For example, similar tissue samples (eg. same disease) may be collected from different patients and hospitals to reflect diversity in the population and in preparation methods. However, it is preferable that the hospitals use similar diagnostic methods (ie. same stains).

As shown in FIG. 3, the input images 304 herein include an image of a key tissue sample section (K1), which may be one of various key tissue sample sections from one or more collections of tissue samples 302. A1 and A2 are images of adjacent tissue samples sections, which are tissue sample sections adjacent to the key tissue sample section. It is noted that the adjacent tissue samples need not be necessarily adjacent in a physical sense, but it may be in a proximate position, or any other position whereby and preferably, there may be some similarities, structural or otherwise may be established with the key tissue sample section such that the morphology between the two sample sections may share some similarities.

Without wishing to be bound by theory, tissue sectioning should be compatible with the multi-modal neural network during training. Once trained, sectioning should follow standard procedures for the disease to avoid disrupting hospital procedures.

Preferably, the training process may start with obtaining an image of each of at least three adjacent sample sections, which includes the key sample section and adjacent sample sections obtained in proximity to the key sample section. For example, the three adjacent samples include the key sample section and two adjacent sample sections as described above, which include K1, A1 and A2 assigned in the sequential order as shown in the Figure, or the three adjacent sample sections being arranged in other possible order as long as they are in close proximity to each other.

During training, at least three directly adjacent sections should be cut to standard thickness (~10 μm). More sections would likely improve final network performance, and the sections are preferably adjacent, because adjacent sections are structurally very similar, which will allow the network to generate the new stain without significant structural confounds.

Preferably, one of the at least three adjacent sample sections may be stained with an output stain, and the remaining adjacent sample sections may be all stained with the input stain. Accordingly, the at least one stained image, or the output stained image(s), represents the key sample section stained with the output stain.

For example, all sections, except for one, are hematoxylin and eosin (H&E) stained as H&E is routinely used in almost all histopathology scenarios. H&E is the input stain and future application of a trained network will only need one H&E stained section. The yet to be stained section is stained with the target output stain, such as an immunostain. As one section typically cannot be stained multiple times, it is generally necessary to have separate sections stained with the input or output stains.

Alternatively, all except for one sample sections are stained with multiple types of the input stain in an alternating manner. For example, if diagnosis of a certain disease routinely uses other stains besides H&E, and these stains can be performed quickly, alternating sections may be stained with H&E and the other stains.

Referring to FIG. 3, these adjacent tissue sample sections A1, A2, may also, be stained, such as with the abovementioned staining strategy that would be desirable for simulating the key tissue sample sections being stained with the same staining agent. In turn, these images of adjacent tissue sample sections A1, A2 would therefore present a similar structure to the key tissue sample sections, whilst having been stained with one or more different staining agents. At its bases, these adjacent images A1, A2 would therefore provide information or guidance as to how the key tissue sample sections should appear K1 when it is also stained with one or more different staining agents, and this information may be usable as knowledge within the machine learning network to generate a simulated image of the key tissue sample sections having been stained with alternative staining agents.

When the key tissue sample sections K1 are stained, for example with a stain different from that being used to stain the adjacent tissue samples A1 and A2, it follows that these images of the key tissue sample sections K1 or adjacent tissue sample sections A1, A2 may be acquired by various means, including by direct access to the output of a light/electron microscope or obtaining these images as a collective set from storage or computing devices or telecommunication devices. In one example usage scenario, the adjacent tissue sections A1, A2 may be tissue sections that are adjacent to the key sample sections K1, and thus may be obtained from a proximate position to the key sample sections K1. As an example of these adjacent tissue sections, the adjacent tissue sections may include the previous tissue slide or the next tissue slide. One unique property of these adjacent tissue sections is that they may represent a similar tissue structure as the key sample sections as they are proximate or directly adjacent to the key sample section. These similarities in tissue structure may therefore be exploited for the generation of a virtual stain of the key sample sections.

In this example procedure, these adjacent tissue sections A1, A2 may also be stained with other stains, such as special stains and/or immunostains. In turn, images of these adjacent tissue sections, referred to as adjacent images, may therefore show an image of a tissue sample section K1 that would have a similar tissue structure to the key sample, but stained with a different stain. This would in turn, provide the basis for a similarity or relationship between the key tissue sample K1, either unstained or stained with a first staining agent, and an adjacent tissue sample A1 or A2, stained with another staining agent.

These sets of images 304 from multiple samples 302 may in turn be used to train a stain learning engine, which may include a machine learning network 306 or processor. After training such an engine, the machine learning network 306 or processor may then be able to take unstained images as inputs, and output images of the same tissue section that have been stained with a desire staining agent 308.

Alternatively, or stained (e.g. H&E) images may be used as inputs, and the system may output images of the same tissue section that have been stained with a different staining agent. In turn, allowing medical professionals, scientists or researchers a virtual image of the tissue sample as stained in one of various staining agents available, including standard agents such as H&E as well as other non-standard or alternative staining agents, such as special stains or immunostains. These virtual images may in turn allow scientists or medical professionals to diagnose medical conditions, detect for various results or for further research or may be presented to the end user for other scientific, analysis, storage, processing or diagnosing purposes.

In addition, the sample sections may be preferably imaged with different illumination conditions, such as but not limited to brightfield and autofluorescence. Advantageously, by provided training images with various illumination conditions and/or different input stains, a multi-modal stain learning engine may be built to facilitate more input/output requirements in different applications.

The stained sections may be imaged with standard digital light microscopes found in pathology laboratories. For example, a Nikon Eclipse Upright microscope or an Olympus IX81 microscope may be used. H&E sections are imaged with the brightfield filter. Optionally or alternatively, the sample sections may be imaged with Green Fluorescent Protein (GFP) and/or Red Fluorescent Protein (RFP) filters to acquire the autofluorescence images to achieve a better multi-modal capability of the trained network. Other input stain sections (not H&E) may be imaged with their specified filter. Similarly, the output stain section may also be imaged with its specified filter.

For network training, a calibrated scanning stage microscope may be used to image big sections to obtain more data. For network application, acquiring one field-of-view is adequate to reduce image acquisition time. Lastly, it may be imperative to save acquired images in the microscope's raw image format, rather than in a compressed format such as .jpeg. The inventors found it more preferable not to make any image viewing adjustments such as to contrast and brightness prior to saving the image files.

To further improve the accuracy rate or the performance of the of the multi-modal stain learning engine, preferably, the multi-modal stain learning engine is further arranged to correct spatial mismatches among the stained image representing the key sample section stained with the output stain and the stained images of the adjacent sample sections stained with the input stain with an estimation process.

The inventors devised that, in virtual tissue staining, especially using multi-modal methods, the input and output images used for training may be obtained from different tissue sections, although these different tissue sections are close together and are very similar to each other. Therefore, spatial mismatches may exist in images of each adjacent pairs of adjacent sample sections. If the mismatches are not corrected for, this may lead to image blurring, possibly rendering the output image not suitable for clinical use.

Preferably, an estimation process may be adopted to estimate what the output section would have looked like had it been stained using the input stain. Then the estimated input image is used in network training alongside the acquired output image.

Figure 4:
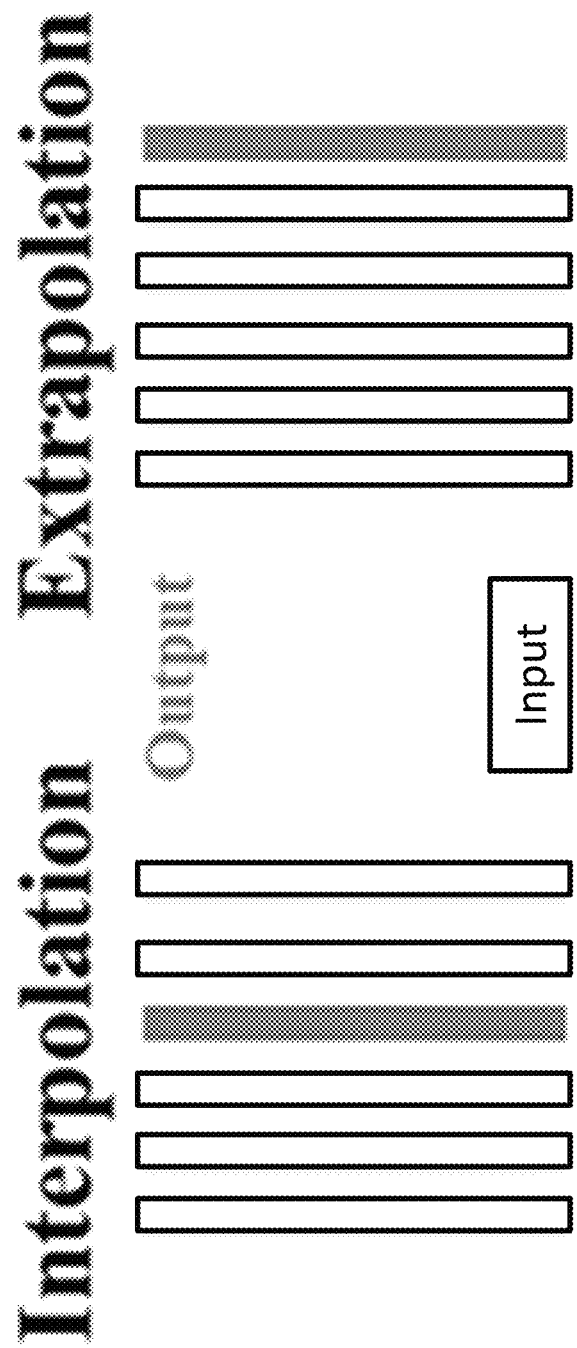
FIG. 4 is an illustration showing an image correction processing with interpolation or extrapolation method being adopted when the input the output images are obtained in different positions of the plurality of sample sections being prepared.

Referring to FIG. 4, estimation may be performed using an interpolation approach if the output section is between adjacent input sections. Interpolation is more preferable as the estimate may be more accurate. Some clinical scenarios, however, only permit the output section on one side of all the input sections. In such cases, an extrapolation approach (see below) is used. Note that estimation is done separately for each input stain image (eg. brightfield, GFP, RFP).

Preferably, the interpolation method is performed by aligning all input images to the output image using 2-dimensional image registration, or 3 degrees-of-freedom rigid-body registration (2 translation, 1 rotation. This accounts for the fact that any slice can be placed anywhere, and at any angle, on the glass slide, but the shape is fixed. The objective function is one suited for intermodal registration, such as mutual information. After registration, apply slice interpolation to the aligned input images to estimate the image of the output section stained with the input stain. Then referencing to the resulting image as the estimated input image.

Note that interpolation may require knowing the section thickness and ordering, which may be known if images were acquired specifically for network training. Also, cutting directly adjacent sections, as may be done in histopathology, leads to better estimates.

In addition, the estimation process may be an extrapolation method. Although extrapolation may lead to worse estimates than interpolation, sometimes training data comes from clinical scenarios where extrapolation is required. For example, surgical resections are often cut into blocks and processed differently, with one block H&E stained and another block immunostained. As for extrapolation, similar to the interpolation method, all input images may be aligned to the output image using rigid-body registration. After registration, the extrapolation method further includes a step of applying an image extrapolation transformation to generate at least one estimated input image based on the stained images of the adjacent sample sections stained with the input stain. Examples of image extrapolation transformation are as discrete orthogonal transforms or learning-based transformation.

Note that extrapolation also requires the section thickness and ordering to be known to the system, and cutting directly adjacent sections leads to better estimates.

After all estimation is complete, there should be one estimated image for each input stain that is spatially matched with the output image.

Figure 5:
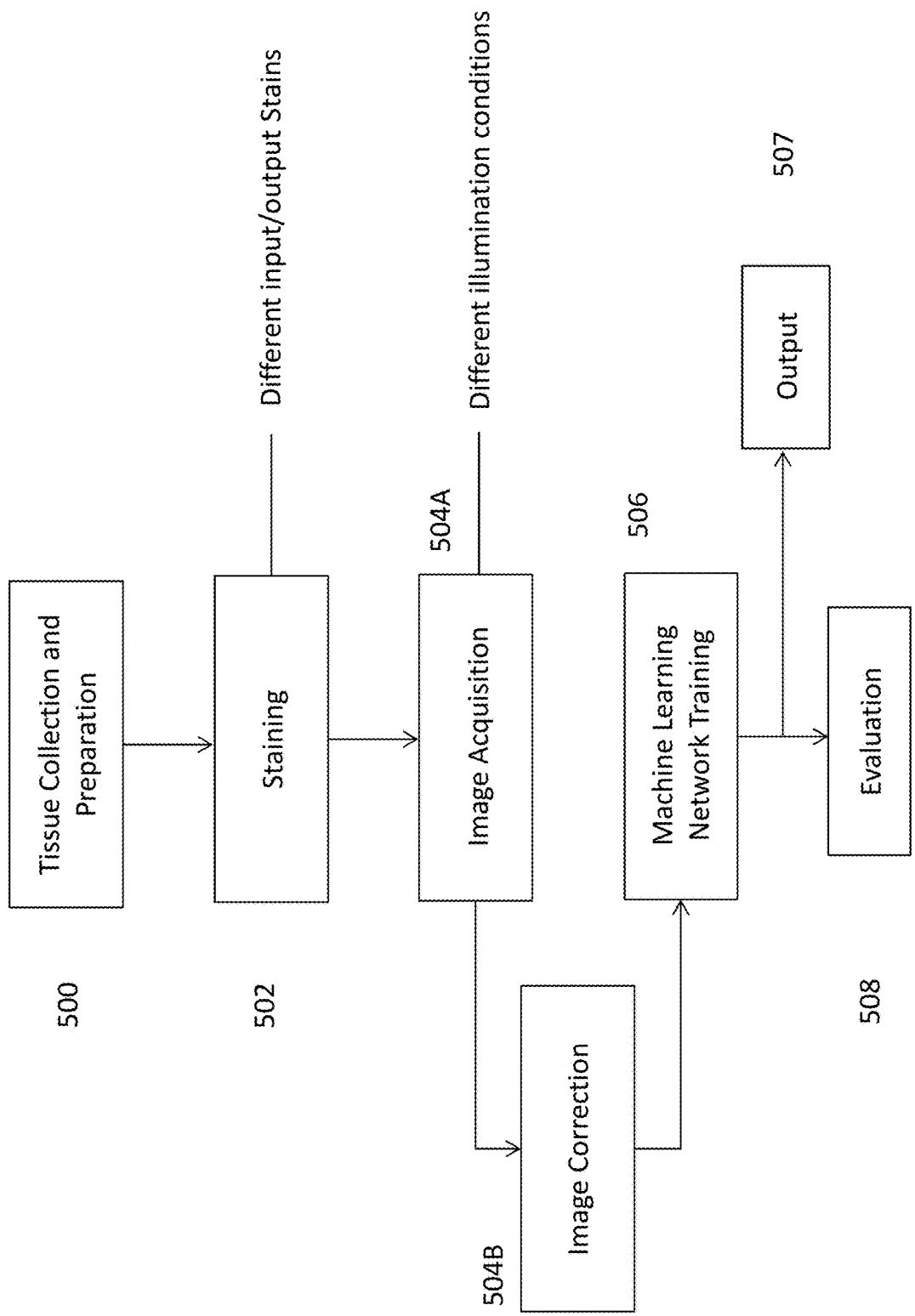
FIG. 5 is a process flow diagram illustrating an example set of method steps to generate a stained image with the system for generating a stained image of FIG. 1.

In one example embodiment as referenced in FIG. 5, the inventors performed an experimental operation of an example of the system for generating a stained image by undertaken 5 example steps (500, 502, 504A/504B, 506 and 508). The results indicated that the system for generating a stained network may operate with existing hospital or lab procedures in obtaining real tissue samples and is able to generate accurate results of simulated tissue sample sections stained that would be deemed adequate for diagnosing or research purposes by experts. The five steps undertaken by the inventors are described below with reference to FIG. 5.

Stage 1—Tissue collection and preparation 500

The method of generating stained images preferably requires an image of at least one tissue sample section for processing so as to generate a virtual stained image. Accordingly, in this example experiment, the inventors or users may firstly obtain a biopsy-sized tissue specimens (millimeters), such as those from surgical discarded tissue so as to prepare frozen sections from the specimens. Images of these specimens may in turn be used to train the machine learning network used in this example method of generating stained images.

According to trials and experimentations performed by the inventors, N=100 is the estimated minimum sample size for training an example machine learning network. A further additional samples of (N>=10) may be needed for prospective evaluation.

To obtain these samples, the procedures described below are similar to those of standard hospital frozen section procedures. This will aid clinical translation of this experiment example of a system for generating a stained image into a clinical environment. Punch biopsies may be used to collect at least one sample from each tissue specimen.

As a test sample, the inventors obtained a tissue sample from a rat that is firstly placed on a mould, and an optimum cutting temperature (OCT) compound is applied to cover the sample. The tissue is snap frozen in isopentane and is placed in the shelf of the cryostat to await sectioning.

Following from this procedure, the holder may then be placed over the tissue and the assembly placed in the frozen chamber at around −22 C. The blade is inserted and the tissue trimmed of excess OCT. A 5 µm thick section is cut, followed by a series of at least n adjacent sections. n is two sections for each non-H&E stain (see next stage). A cooled brush is used to spread the tissue section on the antiroll plate. A room temperature glass slide (for microscopy) is pressed onto the tissue, which adheres due to the temperature difference. The tissue is rapidly fixed by immersing in 95% ethanol for several seconds. The sections are now ready for staining.

Stage 2—Staining 502

The staining stage which follows stage 1 above may stain all the sample sections of each tissue sample prepared in the previous stage (stage 1, 500). For example, the inventors arranged for all except one sample sections to be stained with H&E. The remaining one section is then stained with special stain or immunostains. Common examples that can be used include cytokeratin markers, SOX10, and P40. Later, during the image acquisition phase (504) and machine learning network training (later in stage 3 and stage 4), the brightfield and autofluorescence images of a H&E section was transformed to the brightfield or fluorescence image of the adjacent section, which has a different stain.

As the sections are within micrometers of each other, the tissue microarchitecture is very similar. An example H&E staining protocols for frozen sections is given below.

H&E:
Rinse the slide in tap water
Put in haematoxylin for 1 min
Rinse in tap water for 5 s
Rinse in Scott's tap water for 5 s for bluing
Dip in eosin for 20 s
Rapidly rinse in tap water
95% ethanol for 10 s
100% ethanol for 10 s
100% ethanol for 10 s
Dip in xylene for 20 s
Mount by DPX For the special and immunostains, one may follow the protocol determined by the manufacturer.

As described earlier, to allow a multi-modal stain learning engine to be trained, multiple types of input stains may be necessary, therefore all except one of the prepared sample may be stained with a selected one of the multiple types of input stains, preferably in an alternating manner, and the remaining one of the sample section is to be stained with an output stain instead.

Examples of the above preparation procedure suitable for use with an example method and system for generating stained images are advantageous as the ability of the system and method for generating stained images are able to work with frozen sections, rather than the more common formalin-fixed, paraffin embedded sections, which are unnecessary or not required when operating with an example embodiment of the system for generating a stained image. As the inventor's experiment shows, the method for generating a stained image does not require the common formalin-fixed, paraffin embedding of sections to be performed on the tissue samples. This in turn is advantageous as it renders the preparation of tissue sample sections to be faster, more effective and less expensive. Moreover, the advantages offered may result in faster tissue processing time that is particularly advantageous in surgical procedures where fast diagnoses are required for treatment.

Stage 3—Image acquisition 504A

This third stage 504A may acquire microscope images for training the machine learning network. Brightfield and autofluorescence images may be acquired from all H&E sections. Brightfield or fluorescence images may also be acquired from the special/immuno stained sections. The choice of brightfield or fluorescence, including which filter set, depends on the specific stain used. In the next stage, the machine learning network will be trained to transform the two H&E images of a section into the stain of the adjacent section.

In one example operation, the input images may be obtained after H&E staining as this is less likely to disrupt hospital protocol and thus examples of the method and system for generating stained images may be advantageous as it may operate with existing hospital settings as H&E staining is always performed on frozen sections. In turn, allowing examples of the system and method for generating stained images to operate with existing hospital protocol with minimum disruption.

In this example, microscope image acquisition may be performed with a high-resolution microscope (eg. Nikon Eclipse Upright microscope), capable of fluorescence and brightfield microscopy. The slide with tissue section will be placed on the stage. Images may then be captured with multiple (eg. 4 and 40×) objectives, and 10×eyepiece. The sensor preferably has a high pixelation (eg. 3376×2704).

In addition, autofluorescence images may be acquired with the FITC (465-495 nm excitation, 515-555 nm emission) filter set. The slide will be automatically translated with the stage to acquire multiple FOVs until the entire section is imaged. This is advantageous as translating the stage will allow larger samples to be imaged and provide more training data. Fluorescence images of stains may also be acquired with the filter set the specific stain is designed for. Brightfield images will be acquired with illumination from the halogen lamp.

Preferably, the key image acquisition settings, such as camera exposure time and gain, will be set manually. This is to ensure that acquisition settings remain constant across samples.

Stage 4—Image correction 504B and Training the Machine Learning Network 506

After acquiring all necessary sample images with different input/output stains and different illumination conditions, image correction 504B may be performed to correct the spatial mismatches among all the captured images.

As images of the tissue samples have been obtained and corrected by using the interpolation and/or the extrapolation approaches, these images may then be used to train the machine learning network by using the microscope images acquired above. In one example embodiment, the machine learning network may be trained to take an input such as brightfield and autofluorescence images of tissue sections stained with H&E and/or other stains so as to generate an output that is the adjacent tissue section with a different stain. As adjacent tissue slices are very similar morphologically, the machine learning network may be trained to virtually apply such a stain when generating the stained image 507 as an output.

Preferably, one machine learning network may be trained per non-H&E stain. After training, the network may then receive the input images, such as of a frozen section of a surgery patient, and generate multiple images of the section under different stains.

During trials, experimentations and research, the inventors had found that various machine learning networks are possible to achieve similar results. However, in a preferred example, the inventors had employed a conditional generative adversarial network (cGAN) architecture designed for lung histology images.

As a cGAN is an extension of the original GAN, which has competing generator and discriminator networks. The generator is trained to map H&E images to images under other stains while the discriminator is simultaneously trained to assess if generator outputs are true or fake. In cGAN, the networks are conditioned on additional (image) information.

In one example, the inventors had used a network which has a cGAN pix2pix model with U-Net architecture. The generator has eight convolutional layers and each layer consists of convolution, batch normalization, and activation function LeakyRelu. Each layer has a specific function and is helpful in handling transformation as multiple image sets are inputted in the training process. Convolution employs 4×4 spatial filters with a stride and down sample factor of 2. The number of output channels will increase in a double-folded manner (3, 64, 128, 256, 512, 1024). This can ensure that a more detailed feature map can be extracted in the deeper layers of convolution. Batch normalization is also applied to normalize the data on each image file, and finally rectification function Leaky-ReLu with slope 0.2 is used to increase the non-linearity of the data during training. There are five convolutional layers in the discriminator. Each layer consists of convolution, batch normalization, and activation function LeakyRelu. The architecture and function of each layer is similar to that of the generator except a sigmoid function is placed at the last convolution layer. It outputs a matrix of probability that shows the likelihood of the output image to the real true image.

The whole training process is run on 200 epochs initially, and the epoch number will increase in further training processes in order to enhance the training accuracy. In addition, special techniques, such as skip connection and image augmentation are used to prevent over-fitting and increase the accuracy during the training process.

Stage 5—Prospective evaluation 508

This final stage is optional and was completed by the inventors as part of their trials and experimentations to evaluate the accuracy of the images generated by the method and system for generating stained images. In this example, the inventors evaluated the accuracy of the trained machine learning network on additional H&E stained tissue sections (N>=10 of each tissue type which were not part of training set).

For example, trained networks may be prospectively evaluated using at least 10 additional image sets acquired and processed as for training. Note that evaluation differs from actual application of the network in that there is a need to compare the output image with a physically stained image for accuracy. Therefore, only the images of one input section are required during application.

During training, the estimated images are input into the network to obtain the output image. The computer outputted image is than qualitatively and quantitatively compared with the physically stained version. Qualitative comparisons are done by experienced pathologists looking for similarities of key features used in disease diagnosis, such as cell nuclear morphology and epithelial architecture. Quantitative comparisons are done by standard image metrics such as pixel-wise intensity difference, peak signal-to-noise ratio, and structural similarity index measure.

Figure 6:
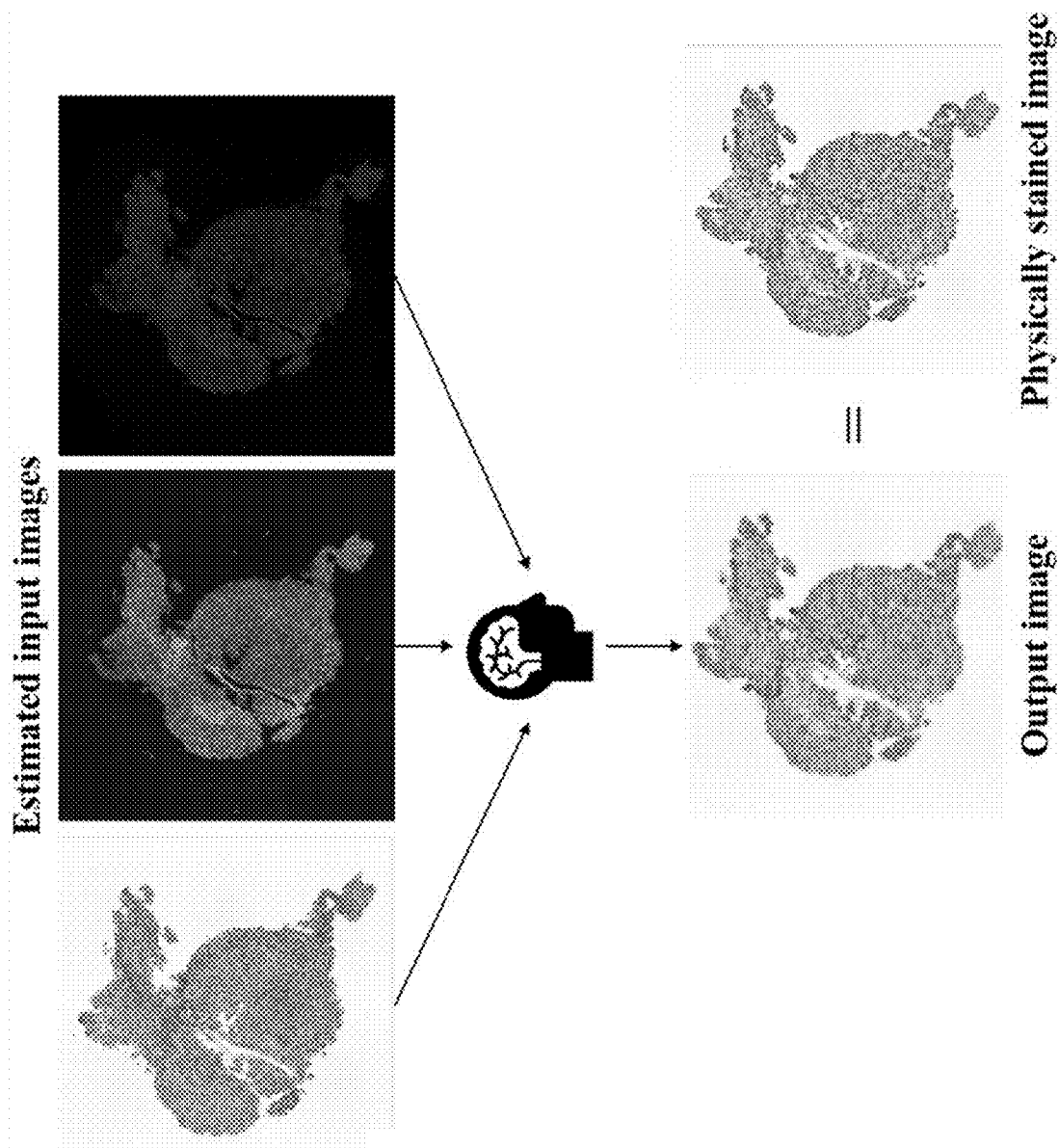
FIG. 6 is an illustration showing an estimated image set (brightfield, GFP, and RFP images of an H&E stained section) inputted into a neural network and a comparison between the virtually stained image and a physically stained image.

With reference to FIG. 6, there is shown an estimated image set (brightfield, GFP, and RFP images of an H&E stained section) inputted into a neural network trained with just 20 sets. The generated output image qualitatively and quantitatively approaches the physically stained image (brightfield image of a pan-cytokeratin stained section). This performance is considerably better than for uni-modal methods.

Example embodiments of the system for generating stained images is advantageous as it may offer a service to virtually stain frozen tissue sections for histopathological assessment. The system and method is arranged to receive input images of a section stained with a standard stain, such as H&E and outputs images of the same section under different stains. In turn, the system may be suitable for use for intraoperative use during tumor resection surgery.

Advantageously, tissues may be observed with virtual tissue staining, simply by imaging the sample tissues with a digital microscope with the tissues being unstained, or stained only with fast and low-cost stains, then these images are inputted into a computer program to generate images of the same tissue under other stains.

Virtual staining may be particularly advantageous for stains that are time consuming or expensive to perform using traditional methods. A good example is immunostaining. Virtual staining also reduces pollutants, promotes digital medicine, and reduces crowding in hospitals.

In addition, multi-modal image synthesis is a significant advancement over the single input, single output approaches as it allows multiple input images to generate the output image. Moreover, it also improves image generation accuracy.

Furthermore, multi-modal image synthesis may utilize the robustness of existing pathology methods better than existing uni-modal image generation methods. For example, uni-modal methods may be restricted to one input image leading to the generation of the output image, in which the input may be an unstained tissue section imaged with a brightfield microscope while the output is a Hematoxylin & Eosin (H&E) stained section imaged with brightfield. Advantageously, with multi-modal synthesis, as input, brightfield and autofluorescence images of the unstained section may be used to generate the H&E stained brightfield image. The inputs images can also be of unstained and H&E stained sections of the tissue and used to generate a special stain image of the tissue.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for generating a stained image comprising the steps of:
    obtaining a first image of a tissue sample section; and
    processing the first image with a multi-modal stain learning engine arranged to virtually stain the first image with at least one stain to generate at least one generated stained image;
    wherein the multi-modal stain learning engine comprises a machine learning network arranged to generate the at least one generated stained image; the machine learning network trained using a training image of each of at least three adjacent sample sections including a key sample section and adjacent sample sections obtained in proximity to the key sample section; the multi-modal stain learning engine further arranged to correct spatial mismatches among the training image representing the key sample section and the training images of the adjacent sample sections with an extrapolation process based on a predetermined section thickness and a predetermined ordering of the key sample section and the adjacent sample sections.

2. The method for generating a stained image in accordance with claim 1, wherein the tissue sample section is physically unstained or physically stained with an input stain.

3. The method for generating a stained image in accordance with claim 1, wherein one of the at least three adjacent sample sections is stained with an output stain; and wherein the remaining adjacent sample sections are all stained with an input stain.

4. The method for generating a stained image in accordance with claim 3, wherein the at least one generated stained image represents the key sample section stained with the output stain.

5. The method for generating a stained image in accordance with claim 3, wherein the remaining adjacent sample sections are stained with multiple types of the input stain in an alternating manner.

6. The method for generating a stained image in accordance with claim 1, wherein the machine learning network includes a generator network arranged to generate the at least one generated stained image over a plurality of cycles and a discriminator network arranged to analyze the at least one generated stained image to provide feedback to the generator network on each of the plurality of cycles.

7. The method for generating a stained image in accordance with claim 6, wherein the machine learning network is a generative adversarial network.

8. The method for generating a stained image in accordance with claim 7, wherein the generative adversarial network is trained with the training images of the at least three adjacent sample sections.

9. The method for generating a stained image in accordance with claim 8, wherein the generative adversarial network is further trained with the training images of the at least three adjacent sample sections imaged with different illumination conditions.

10. The method for generating a stained image in accordance with claim 9, wherein the illumination conditions include brightfield and autofluorescence.

11. The method for generating a stained image in accordance with claim 3, wherein each of the input stain and the output stain includes at least one of hematoxylin and eosin (H&E) and a special stain.

12. The method for generating a stained image in accordance with claim 11, wherein the special stain includes immunostains.

13. The method for generating a stained image in accordance with claim 12, wherein the at least three adjacent sample sections are frozen.

14. The method for generating a stained image in accordance with claim 13, wherein the at least three adjacent sample sections are formalin-fixed and embedded in paraffin.

15. The method for generating a stained image in accordance with claim 1, wherein the training image representing the key sample section is stained with an output stain and the training images of the adjacent sample sections are stained with an input stain.

16. The method for generating a stained image in accordance with claim 15, wherein the multi-modal stain learning engine is further arranged to align all training images of the adjacent sample sections stained with the input stain to the training image representing the key sample section stained with the output stain using extrapolation.

17. The method for generating a stained image in accordance with claim 1, wherein the extrapolation process further includes a step of applying an image extrapolation transformation to generate at least one estimated input image based on the training images of the adjacent sample sections stained with the input stain.

18. A system for generating a stained image comprising:
    an image gateway comprising an input device arranged to obtain a first image of a tissue sample section; and
    an image generator comprising a multi-modal stain learning engine which further comprises a machine learning network; the image generator arranged to process the first image with the multi-modal stain learning engine arranged to virtually stain the first image with at least one stain to generate at least one generated stained image;
    wherein the multi-modal stain learning engine comprises a machine learning network arranged to generate the at least one generated stained image; the machine learning network trained using a training image of each of at least three adjacent sample sections including a key sample section and adjacent sample sections obtained in proximity to the key sample section; the multi-modal stain learning engine further arranged to correct spatial mismatches among the training image representing the key sample section and the training images of the adjacent sample sections with an extrapolation process based on a predetermined section thickness and a predetermined ordering of the key sample section and the adjacent sample sections.

19. The system for generating a stained image in accordance with claim 18, wherein the tissue sample section is physically unstained or physically stained with an input stain.

20. The system for generating a stained image in accordance with claim 18, wherein one of the at least three adjacent sample sections is stained with an output stain; and wherein the remaining adjacent sample sections are all stained with an input stain.

21. The system for generating a stained image in accordance with claim 20, wherein the at least one generated stained image represents the key sample section stained with the output stain.

22. The system for generating a stained image in accordance with claim 20, wherein the remaining adjacent sample sections are stained with multiple types of the input stain in an alternating manner.

23. The system for generating a stained image in accordance with claim 18, wherein the machine learning network includes a generator network arranged to generate the at least one generated stained image over a plurality of cycles and a discriminator network arranged to analyze the at least one generated stained image to provide feedback to the generator network on each of the plurality of cycles.

24. The system for generating a stained image in accordance with claim 23, wherein the machine learning network is a generative adversarial network.

25. The system for generating a stained image in accordance with claim 24, wherein the generative adversarial network is trained with the training images of the at least three adjacent sample sections.

26. The system for generating a stained image in accordance with claim 25, wherein the generative adversarial network is further trained with the training images of the at least three adjacent sample sections imaged with different illumination conditions.

27. The system for generating a stained image in accordance with claim 26, wherein the illumination conditions include brightfield and autofluorescence.

28. The system for generating a stained image in accordance with claim 20, wherein each of the input stain and the output stain includes at least one of hematoxylin and eosin (H&E) and a special stain.

29. The system for generating a stained image in accordance with claim 28, wherein the special stain includes immunostains.

30. The system for generating a stained image in accordance with claim 29, wherein the at least three adjacent sample sections are frozen.

31. The system for generating a stained image in accordance with claim 30, wherein the at least three adjacent sample sections are formalin-fixed or embedded in paraffin.

32. The system for generating a stained image in accordance with claim 18, wherein the training image representing the key sample section is stained with an output stain and the training images of the adjacent sample sections are stained with an input stain.

33. The system for generating a stained image in accordance with claim 32, wherein the multi-modal stain learning engine is arranged to align all training images of the adjacent sample sections stained with the input stain to the training image representing the key sample section stained with the output stain using extrapolation.

34. The system for generating a stained image in accordance with claim 33, wherein the multi-modal stain learning engine is further arranged to apply an image transformation to generate at least one estimated input image based on the training images of the adjacent sample sections stained with the input stain.

* * * * *